United States Patent
Qi et al.

(10) Patent No.: US 9,708,949 B2
(45) Date of Patent: Jul. 18, 2017

(54) EXHAUST AFTERTREATMENT SYSTEM FOR A COMPRESSION-IGNITION ENGINE

(71) Applicant: GM GLOBAL TECHNOLOGY OPERATIONS LLC, Detroit, MI (US)

(72) Inventors: Gongshin Qi, Troy, MI (US); John T. Johnson, Sterling Heights, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/304,890

(22) Filed: Jun. 14, 2014

(65) Prior Publication Data

US 2015/0361848 A1  Dec. 17, 2015

(51) Int. Cl.
| | |
|---|---|
| *F01N 3/035* | (2006.01) |
| *F01N 3/20* | (2006.01) |
| *F01N 3/021* | (2006.01) |
| *F01N 3/10* | (2006.01) |
| *F01N 3/022* | (2006.01) |
| *B01D 53/90* | (2006.01) |
| *B01D 53/94* | (2006.01) |

(52) U.S. Cl.
CPC ....... *F01N 3/2066* (2013.01); *B01D 53/9477* (2013.01); *F01N 3/021* (2013.01); *F01N 3/0222* (2013.01); *F01N 3/035* (2013.01); *F01N 3/103* (2013.01); *B01D 53/90* (2013.01); *B01D 53/944* (2013.01); *B01D 53/9418* (2013.01); *B01D 2251/2067* (2013.01); *B01D 2255/1021* (2013.01); *B01D 2255/1023* (2013.01); *B01D 2255/2063* (2013.01); *B01D 2255/2065* (2013.01); *B01D 2255/20707* (2013.01); *B01D 2255/20715* (2013.01); *B01D 2255/20723* (2013.01); *B01D 2255/20738* (2013.01); *B01D 2255/20746* (2013.01); *B01D 2255/20753* (2013.01); *B01D 2255/20761* (2013.01); *B01D 2255/20776* (2013.01); *B01D 2255/50* (2013.01); *B01D 2255/908* (2013.01); *B01D 2255/911* (2013.01); *B01D 2255/9205* (2013.01); *F01N 2340/02* (2013.01); *F01N 2610/02* (2013.01); *Y02T 10/24* (2013.01)

(58) Field of Classification Search
CPC ........ F01N 2250/02; B01D 2255/1021; B01D 2255/1023; B01D 2255/9155; B01J 23/42; B01J 23/44; B01J 35/1076
See application file for complete search history.

(56) References Cited

U.S. PATENT DOCUMENTS

| | | | |
|---|---|---|---|
| 2009/0288402 A1* | 11/2009 | Voss et al. | 60/299 |
| 2013/0149207 A1* | 6/2013 | Castagnola | B01J 35/0006 422/177 |

(Continued)

*Primary Examiner* — Jonathan Matthias

(57) ABSTRACT

An exhaust aftertreatment system for purifying exhaust gases from a compression-ignition engine includes a first exhaust aftertreatment device including an oxidation catalyst and a particulate filter element fluidly coupled to an exhaust outlet of the engine. A second exhaust aftertreatment device includes an ammonia-selective catalytic reduction catalyst fluidly coupled to a downstream outlet of the first exhaust aftertreatment device. A reductant injection system is configured to inject urea reductant into the exhaust gas feedstream between the first exhaust aftertreatment device and the second exhaust aftertreatment device.

10 Claims, 2 Drawing Sheets

(56) References Cited

U.S. PATENT DOCUMENTS

2015/0165423 A1\* 6/2015 Sung .................. B01J 29/076
 423/213.5
2015/0165434 A1\* 6/2015 Yin .................. B01J 35/0006
 502/333

\* cited by examiner

EXHAUST AFTERTREATMENT SYSTEM FOR A COMPRESSION-IGNITION ENGINE

TECHNICAL FIELD

This disclosure is related to exhaust purification systems for compression-ignition internal combustion engines.

BACKGROUND

The statements in this section merely provide background information related to the present disclosure. Accordingly, such statements are not intended to constitute an admission of prior art.

Compression-ignition internal combustion engines operate at lean air/fuel ratios to achieve desirable fuel efficiencies. Lean engine operation may produce oxides of nitrogen (NOx) when nitrogen and oxygen molecules present in engine intake air disassociate in the high temperatures of combustion. Rates of NOx production follow known relationships in the combustion process, for example, with higher rates of NOx production being associated with higher combustion temperatures and longer exposure of air molecules to the higher temperatures. NOx molecules may be reduced to nitrogen and water in aftertreatment devices. Efficacy of known aftertreatment devices is dependent upon operating conditions including operating temperature, which is associated with exhaust gas flow temperatures and engine air/fuel ratio. Aftertreatment devices include materials prone to damage or degradation when exposed to elevated temperatures and/or contaminants in the exhaust gas feedstream.

Aftertreatment systems purify exhaust gases by filtering, oxidizing and/or reducing constituents in an exhaust gas feedstream. Three-way catalytic devices (TWC) oxidize and reduce exhaust gas constituents. NOx adsorbers store NOx, which may be subsequently desorbed and reduced under specific engine operating conditions. Diesel particulate filters (DPF) are able to remove particulate matter in the exhaust gas feedstream through mechanical filtering. A selective catalytic reduction device (SCR) includes catalytic material that promotes the reaction of NOx with a reductant such as ammonia (NH3) to produce nitrogen and water. Reductants, e.g., urea, may be injected into an exhaust gas feedstream upstream of the SCR device. Reductants, e.g., NH3, may also be generated in an exhaust gas feedstream upstream of the SCR device during specific engine operating conditions. Catalytic materials used in SCR devices have included vanadium (V) and tungsten (W) on titanium (Ti) and base metals including iron (Fe) or copper (Cu) with a zeolite washcoat.

SUMMARY

An exhaust aftertreatment system for purifying exhaust gases from a compression-ignition engine includes a first exhaust aftertreatment device including an oxidation catalyst and a particulate filter element fluidly coupled to an exhaust outlet of the engine. A second exhaust aftertreatment device includes an ammonia-selective catalytic reduction catalyst fluidly coupled to a downstream outlet of the first exhaust aftertreatment device. A reductant injection system is configured to inject urea reductant into the exhaust gas feedstream between the first exhaust aftertreatment device and the second exhaust aftertreatment device.

BRIEF DESCRIPTION OF THE DRAWINGS

One or more embodiments will now be described, by way of example, with reference to the accompanying drawings, in which.

DETAILED DESCRIPTION

Figure 1:
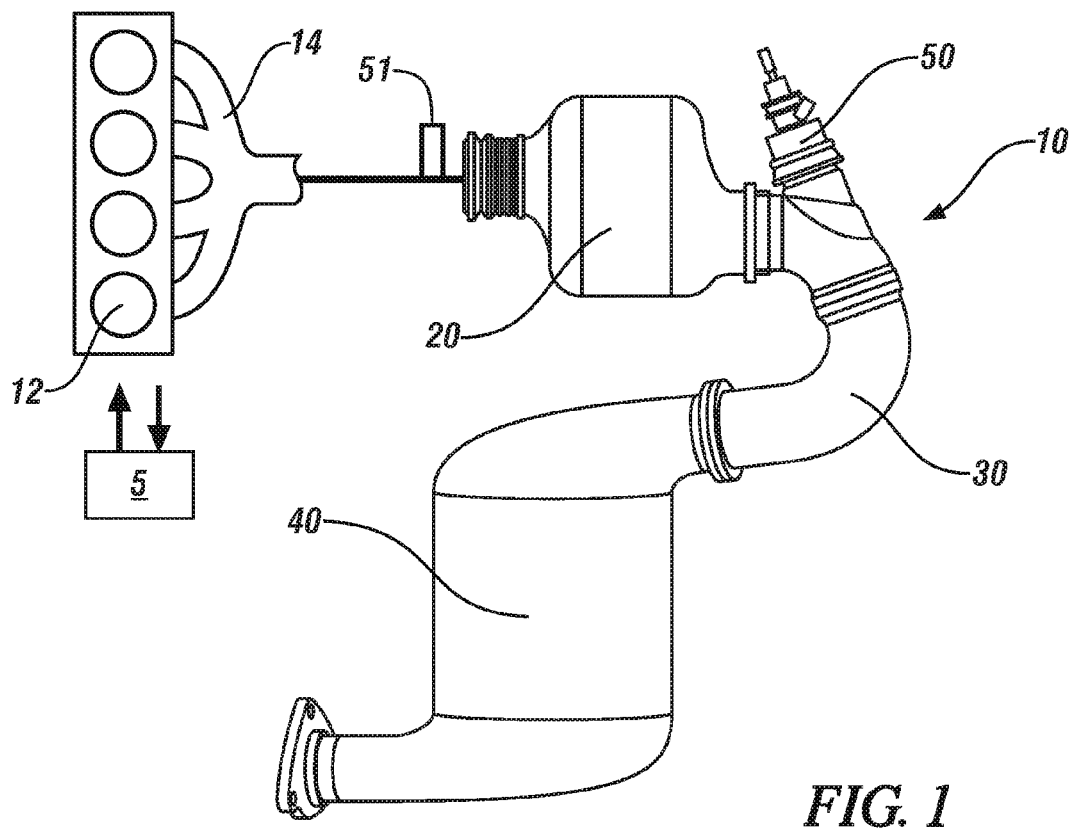
FIG. 1 illustrates an exhaust aftertreatment system for an internal combustion engine including a first exhaust aftertreatment device, a second exhaust aftertreatment device, and a reductant injection system, in accordance with the disclosure.

Referring now to the drawings, wherein the showings are for the purpose of illustrating certain exemplary embodiments only and not for the purpose of limiting the same, FIG. 1 schematically illustrates an exhaust aftertreatment system 10 that has been constructed in accordance with an embodiment of the disclosure to purify exhaust gases that are output from a compression-ignition internal combustion engine 12.

In one embodiment, the internal combustion engine 12 is a multi-cylinder spark-ignition, direct-injection, four-stroke internal combustion engine operative in a repetitive combustion cycle including intake, compression, power and exhaust strokes. The engine 12 operates at an air/fuel ratio that is primarily lean of stoichiometry, and generates exhaust gases including hydrocarbons (HC), carbon monoxide (CO), nitrogen oxides (NOx) and particulate matter (PM). The engine 12 has an exhaust outlet that preferably includes an exhaust manifold 14 that directs exhaust gases flowing therethrough, with the exhaust gases directed to the exhaust aftertreatment system 10. Operation of the engine 12 is monitored and controlled by an engine controller 5.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The controller has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

The exhaust aftertreatment system 10 purifies exhaust gases from the compression-ignition internal combustion engine 12, and includes a first exhaust aftertreatment device 20, a second exhaust aftertreatment device 40, and a reductant injection system 50. The first exhaust aftertreatment device 20 includes an oxidation catalyst and a particulate filter element, and fluidly couples to an exhaust outlet, e.g., the exhaust manifold 14 of the engine 12. The second exhaust aftertreatment device 40 includes an ammonia-selective catalytic reduction catalyst that fluidly couples to a downstream outlet of the first exhaust aftertreatment device 40 via an exhaust pipe 30. A reductant injection system 50 injects urea reductant into the exhaust gas feedstream between the first exhaust aftertreatment device 20 and the second exhaust aftertreatment device 40.

The exhaust aftertreatment system 10 preferably includes exhaust gas sensors, including a first sensor 51 that monitors the engine-out exhaust gas feedstream including a state of a parameter correlatable to engine-out air/fuel ratio and/or a constituent of engine-out exhaust gas. The exhaust aftertreatment system 10 includes other sensors, including a sensor that monitors the exhaust gas feedstream downstream of the exhaust aftertreatment system 10. The monitoring of the exhaust gas feedstream includes, e.g., monitoring a state of a parameter correlatable to the engine-out air/fuel ratio, monitoring a constituent of the exhaust gas feedstream, or monitoring an operating characteristic of the exhaust aftertreatment system 10 or one of the devices thereof, e.g., temperature. The signal outputs from the first sensor 51 and other sensors are monitored by the controller 5 for purposes related to control and diagnostics of the engine 12 and the exhaust aftertreatment system 10.

The first exhaust aftertreatment device 20 includes an oxidation catalyst in combination with a particulate filter element that fluidly couples to the exhaust manifold 14 of the engine 12 to treat raw exhaust gases output from the engine 12. Treating raw exhaust gases preferably includes oxidizing unburned hydrocarbons (HCs) and mechanically removing particulate matter by filtering. In one embodiment, the particulate filter element includes a ceramic substrate in the form of a monolithic cordierite substrate having a cell density about 31 to 62 cells per square centimeter (200-400 cells per square inch), and a wall thickness of three to seven mils. Alternating cells of the substrate are plugged at one end. The walls of the substrate have high porosity, e.g., about 55% porosity or higher with a mean pore size of about 25 microns to permit flow of exhaust gases to entrap particulate matter in the exhaust gas feedstream. Other suitable substrates may be employed to trap, oxidize, and otherwise manage particulate matter produced during combustion. The walls of the substrate are impregnated with a catalytically active washcoat for oxidizing unburned HCs contained in the exhaust gas feedstream. The washcoat includes suitable catalytically active materials, e.g., platinum-group metals including Pt, Pd, and Rh, and additives including, e.g., Ce, Zr, La, at densities and ratios sufficient to effect oxidation of the unburned HCs and perform other operations such as oxygen storage for diagnostic evaluations. In one embodiment, a powder having a 50 g/ft$^3$ at a ratio of 2:1 Pt:Pd is prepared using a slurry having chloroplatinic acid ($H_2PtCl_6 \cdot 6H_2O$) and palladium nitrate ($Pd(NO_3)_2$) that is mixed with a solution containing platinum and a solution containing palladium that was stirred, dried, and calcined. Platinum and palladium loadings can range across ratios from 10:1 to 1:10 and loadings between 50 to 200 g/cu. ft. A washcoat slurry containing the calcined powder, water and acetic acid is prepared and applied to a cordierite substrate core using a longitudinal slurry flow process. The coated substrate is dried and calcined, and then assembled into a finished device that is assembled onto a vehicle. Design features including total volume, space velocity, cell density, washcoat materials, and loading(s) of catalytic material(s) are application-specific.

The first exhaust aftertreatment device 20 is preferably assembled to the exhaust manifold 14 in an underhood location, and is close-coupled to the engine exhaust so as to maximize heat transfer from the engine exhaust to the first exhaust aftertreatment device 20. The first exhaust aftertreatment device 20 can be close-coupled to the engine exhaust by direct assembly to the exhaust manifold 14 without any intervening exhaust pipe. Alternatively, a flexible coupling unit may be assembled between the exhaust manifold 14 and the first exhaust aftertreatment device 20. The first exhaust aftertreatment device 20 can be close-coupled to the engine exhaust by being configured as a plurality of exhaust aftertreatment devices 20 arranged in parallel and assembled into runners of the exhaust manifold 14.

The second exhaust aftertreatment device 40 includes an ammonia-selective catalytic reactor device (NH3-SCR device) that fluidly couples to a downstream outlet of the first exhaust aftertreatment device 20. The second exhaust aftertreatment device 40 is preferably assembled downstream of the first exhaust aftertreatment device 20 in an underhood location or an underbody location, depending upon space availability and other factors. The NH3-SCR device 40 includes one or more ceramic coated substrates preferably fabricated from cordierite material and having a multiplicity of flowthrough passageways that are coated with washcoat and catalytic materials to store ammonia for reacting with NOx molecules present in the exhaust gas feedstream. The NH3-SCR device 40 reduces NOx into other molecules, including nitrogen and water. The substrate is preferably coated with a zeolite washcoat and catalytic material including a catalytically active base metal. The substrate includes a cordierite or metal monolith with a cell density about 62 to 93 cells per square centimeter (400-600 cells per square inch), and a wall thickness ranging from three to seven mils. The cells of the substrate include flow passages through which exhaust gas flows to contact the catalyst to effect storage of ammonia. The substrate is impregnated with the zeolite washcoat. The zeolite washcoat contains catalytically active base metals, e.g., iron (Fe), copper (Cu), cobalt (Co), and/or nickel (Ni). Alternatively, vanadium-based and/or tungsten (W) on titanium (Ti) compositions may be used as catalysts.

The urea injection device 50 injects urea into the exhaust pipe 30 upstream of the NH3-SCR device 40 via a nozzle inserted therein in response to a command from a controller, e.g., the engine controller 5. The exhaust aftertreatment system 10 is preferably located in an engine compartment of a vehicle, with the oxidation catalyst in combination with the particulate filter element 20 closely coupled to the engine exhaust outlet to effect rapid light-off thereof during an engine cold start and run event.

The configuration of the first exhaust aftertreatment device 20 and the second exhaust aftertreatment device 40 affords flexibility to engine and exhaust system designers by reducing overall physical size, mass and cost of the exhaust aftertreatment system, and also reduces the thermal mass of the system leading to reduced warm-up times and reduced hydrocarbon light-off times during an engine cold start and run event. It also permits flexibility in locating the SCR device, including locating the SCR device in a vehicle underbody position.

Figure 2:
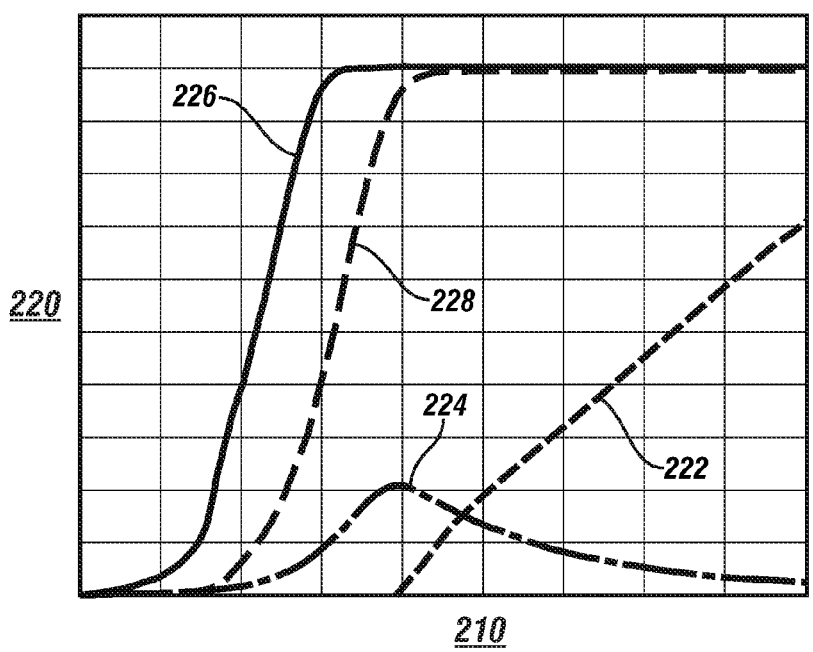
FIG. 2 illustrates emissions reduction performance for a known oxidation catalyst in relation to average temperature (° C.), with conversion (%) and concentration (ppm) shown in relation to average temperature (° C.), in accordance with the disclosure.

FIG. 2 graphically shows emissions reduction performance for a known oxidation catalyst in relation to average temperature (° C.), with conversion (%) and concentration (ppm) shown on the vertical axis 220 in relation to average temperature (° C.) shown on the horizontal axis 210. Depicted data includes NO2 concentration (ppm) (222), N2O concentration (ppm) (224), CO conversion (%) (226) and C3H6 conversion (%) (228) in relation to average temperature (° C.). The catalysts had PGM loading of 50 g/cu. ft. with a Pt/Pd ratio of 2:1 and a washcoat loading of 60 g/L, and were aged at 750° C. for 24 hours in 10% $H_2O$/air. The test conditions included a feedstream consisting of 200 ppm NO, 8% O2, 500 ppm C3H6/C3H8, 1000 ppm CO, space velocity of 30,000/hour, with temperature ramping at a rate of 2° C./hour.

Figure 3:
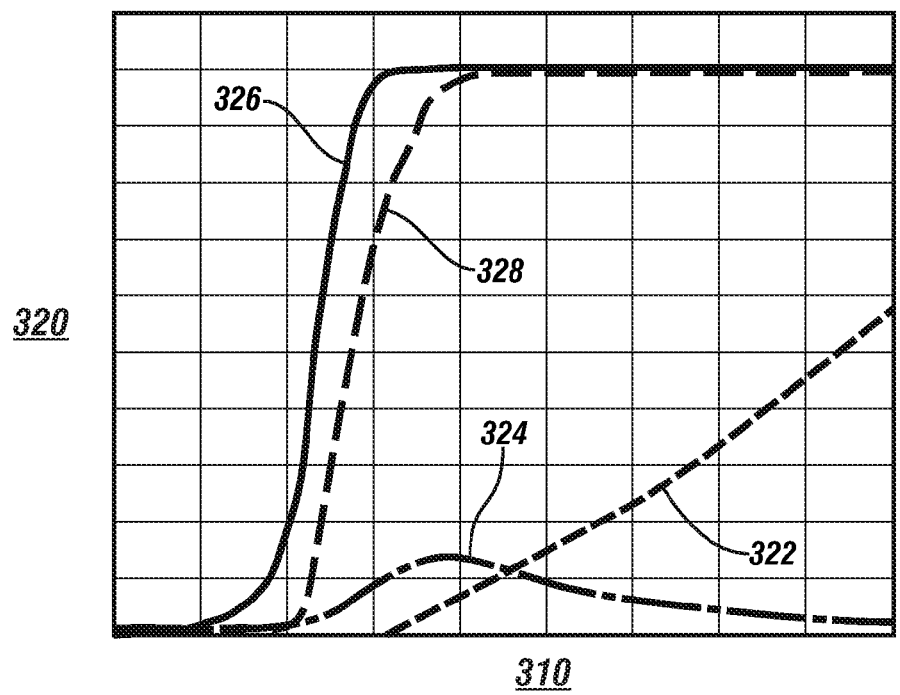
FIG. 3 illustrates emissions reduction performance for an embodiment of the oxidation catalyst in combination with a particulate filter element in relation to average temperature (° C.), with conversion (%) and concentration (ppm) shown in relation to average temperature (° C.), in accordance with the disclosure.

FIG. 3 graphically shows emissions reduction performance for an embodiment of the oxidation catalyst in combination with a particulate filter element in relation to average temperature (° C.), with conversion (%) and concentration (ppm) shown on the vertical axis 320 in relation to average temperature (° C.) shown on the horizontal axis 310. Depicted data includes NO2 concentration (ppm) (322), N2O concentration (ppm) (324), CO conversion (%) (326) and C3H6 conversion (%) (328) in relation to average temperature (° C.). Each of the catalysts had PGM loading of 50 g/cu. ft. with a Pt/Pd ratio of 2/1 and a washcoat loading of 60 g/L, and were aged at 750° C. for 24 hours in 10% $H_2O$/air. The test conditions included a feedstream consisting of 200 ppm NO, 8% O2, 500 ppm C3H6/C3H8, 1000 ppm CO, space velocity of 30,000/hour, with temperature ramping at a rate of 2° C./hour.

Figure 4:
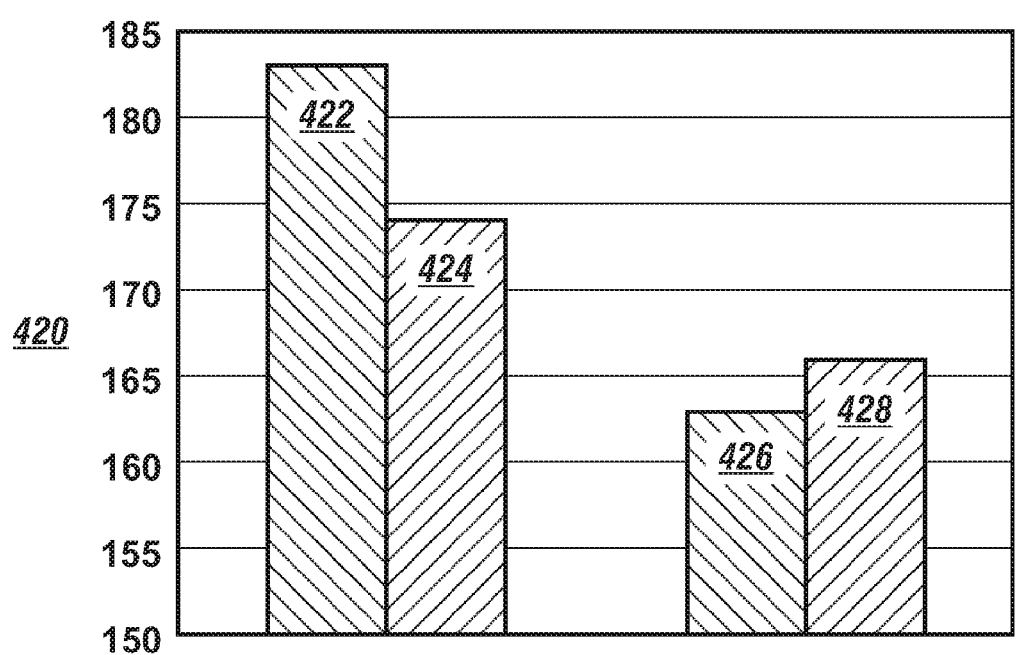
FIG. 4 illustrates a comparison of light-off temperatures for the oxidation catalyst and for the oxidation catalyst in combination with a particulate filter element, in accordance with the disclosure.

FIG. 4 graphically shows a comparison of some of the results shown in FIGS. 2 and 3 in context of temperature (° C.) shown on the vertical axis 420. The results include a light-off or T50 temperature (° C.) for C3H6 for the oxidation catalyst (422) in comparison with a T50 temperature (° C.) for C3H6 for the oxidation catalyst in combination with the particulate filter element (424). The results indicate a temperature reduction in the C3H6, i.e., hydrocarbon light-off temperature of about 9° C. for the oxidation catalyst in combination with the particulate filter element (424) in comparison to a light-off temperature for the oxidation catalyst (422). The results include a light-off or T50 temperature (° C.) for CO for the oxidation catalyst (426) in comparison to a T50 temperature (° C.) for CO for the oxidation catalyst in combination with the particulate filter element (428). The results indicate an increase of about 3° C. in the CO light-off temperature for the oxidation catalyst in combination with the particulate filter element (428) in comparison to the oxidation catalyst (426).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An exhaust aftertreatment system for purifying exhaust gases from a compression-ignition engine, comprising:
    an engine outputting exhaust gases;
    a first exhaust aftertreatment device comprising a particulate filter element comprising a ceramic substrate impregnated with an oxidation catalyst washcoat effective to oxidize unburned hydrocarbons, the first exhaust aftertreatment device close-coupled to the exhaust gases without any intervening exhaust gas aftertreatment device such that said first exhaust gas aftertreatment device is the first exhaust gas aftertreatment device to treat exhaust gases exiting said engine, the oxidation catalyst washcoat comprising;
        water, acetic acid, and a calcined powder, the calcined powder prepared from a slurry having chloroplatinic acid and palladium nitrate that is mixed with a solution containing platinum and a solution containing palladium;
    a second exhaust aftertreatment device comprising flow-through passageways coated with an ammonia-selective catalytic reduction catalyst fluidly coupled to a downstream outlet of the first exhaust aftertreatment device; and
    a reductant injection system for injecting urea reductant into the exhaust gas feedstream between the first exhaust aftertreatment device and the second exhaust aftertreatment device.

2. The exhaust aftertreatment system of claim 1, wherein the ceramic substrate comprises a monolithic cordierite substrate, said substrate comprising high-porosity walls and alternating cells plugged at one end.

3. The exhaust aftertreatment system of claim 2, wherein the high-porosity walls of the monolithic cordierite substrate are impregnated with the catalytically active washcoat.

4. The exhaust aftertreatment system of claim 3, wherein the catalytically active washcoat comprises platinum and palladium at a ratio of 2:1 and a loading between 50 g/cu. ft. and 200 g/cu. ft.

5. The exhaust aftertreatment system of claim 1, wherein the second exhaust aftertreatment device is located in an underbody position.

6. An exhaust aftertreatment system for purifying exhaust gases from a compression-ignition engine, comprising:
    an engine outputting exhaust gases;
    a first exhaust aftertreatment device comprising a catalyzed particulate filter element close-coupled to the exhaust gases without any intervening exhaust aftertreatment device such that said first exhaust aftertreatment device is the first exhaust aftertreatment device to treat exhaust gases exiting said engine, the catalyzed particulate filter element including a ceramic substrate impregnated with a catalytically active washcoat effective to oxidize unburned hydrocarbons, the catalytically active washcoat comprising;
        water, acetic acid, and a calcined powder, the calcined powder prepared from a slurry having chloroplatinic acid and palladium nitrate that is mixed with a solution containing platinum and a solution containing palladium;
    a second exhaust aftertreatment device comprising flow-through passageways coated with an ammonia-selective catalytic reduction catalyst fluidly coupled to a downstream outlet of the first exhaust aftertreatment device; and
    a reductant injection system for injecting reductant into the exhaust gas feedstream upstream of the second exhaust aftertreatment device.

7. The exhaust aftertreatment system of claim 6, wherein the ceramic substrate comprises a monolithic cordierite substrate, said substrate comprising high-porosity walls and alternating cells plugged at one end.

8. The exhaust aftertreatment system of claim 7, wherein the high-porosity walls of the monolithic cordierite substrate are impregnated with the catalytically active washcoat.

9. The exhaust aftertreatment system of claim 8, wherein the catalytically active washcoat comprises platinum and palladium at a ratio of 2:1 and a loading between 50 g/cu. ft. and 200 g/cu. ft.

10. The exhaust aftertreatment system of claim 6, wherein the second exhaust aftertreatment device is located in an underbody position.

* * * * *